United States Patent

Yamamura

Patent Number: 5,394,044
Date of Patent: Feb. 28, 1995

[54] MAGNETIC BEARING DEVICE

[75] Inventor: Akira Yamamura, Tokyo, Japan

[73] Assignee: Nippon Ferrofluidics Corporation, Tokyo, Japan

[21] Appl. No.: 119,528

[22] Filed: Sep. 13, 1993

Related U.S. Application Data

[63] Continuation of Ser. No. 780,565, Oct. 21, 1991, abandoned, which is a continuation of Ser. No. 461,220, Jan. 5, 1990, abandoned.

[51] Int. Cl.6 .............................................. H02K 7/09
[52] U.S. Cl. ..................................... 310/90.5; 310/36; 310/51
[58] Field of Search ...................... 310/90.5, 51, 36; 188/268

[56] References Cited

U.S. PATENT DOCUMENTS

| | | | |
|---|---|---|---|
| 3,856,200 | 12/1974 | Lieb | 310/90.5 |
| 4,080,012 | 3/1978 | Boden | 310/90.5 |
| 4,082,376 | 4/1978 | Wehde | 310/90.5 |
| 4,223,240 | 9/1980 | Theyse | 310/90.5 |
| 4,236,426 | 12/1980 | Meinke | 310/51 |
| 4,244,629 | 1/1981 | Habermann | 310/90.5 |
| 4,268,095 | 5/1981 | Millner | 310/90.5 |
| 4,312,628 | 1/1982 | Yamamura | 310/90.5 |
| 4,334,718 | 6/1982 | Hirt | 310/90.5 |
| 4,440,271 | 4/1984 | Boreas | 188/268 |
| 4,609,332 | 9/1986 | Miki | 310/90.5 |
| 4,686,057 | 8/1987 | Lochner | 188/268 |
| 4,710,656 | 12/1987 | Studer | 310/51 |
| 4,934,781 | 6/1990 | Kato | 310/90.5 |
| 5,023,497 | 6/1991 | Pereny | 310/36 |

FOREIGN PATENT DOCUMENTS

| | | | |
|---|---|---|---|
| 0332979 | 9/1989 | European Pat. Off. | 310/90.5 |
| 2825551 | 12/1979 | Germany | 310/90.5 |
| 1190113 | 11/1985 | U.S.S.R. | 310/90.5 |

Primary Examiner—R. Skudy
Attorney, Agent, or Firm—Armstrong, Westerman, Hattori, McLeland and Naughton

[57] ABSTRACT

This invention discloses a magnetic bearing device comprising a rotary member rotatably supported on a supporting member through a magnetic bearing, a free oscillating member which is oscillatable almost coaxially with the rotary member and disposed at a position not being in contact with both supporting member and rotary member, magnetic coupling member for oscillating the free oscillating member and the rotary member together, and a damping member disposed between the free oscillating member and the supporting member.

4 Claims, 4 Drawing Sheets

MAGNETIC BEARING DEVICE

This application is a continuation of application Ser. No. 07/780,565, filed Oct. 21, 1991, now abandoned, which in turn is a continuation of application Ser. No. 07/461,220, filed Jan. 5, 1990, now abandoned.

BACKGROUND OF THE INVENTION

1. Industrial Field

This invention relates to a magnetic bearing device and, more particularly, to a single shaft control type magnetic bearing device being formed into an active magnetic bearing in the direction of rotary shaft, while being formed into a passive magnetic bearing in radial direction.

2. Prior Art

Generally, in magnetic bearings of single shaft control type, two opposite sides of a rotor are supported by a passive magnetic bearing in radial direction. However, damping characteristics of this passive magnetic bearing in radial direction are not always preferable and amplitude magnification thereof at resonance point is large. To prevent accident at the time of passing resonance point, a damper making use of eddy current or a damper whose stator section is movable by metal spring is adopted as countermeasure. However, the damper making use of eddy current has a problem of poor damping characteristics, and the damper of movable stator section has a problem of being easily affected by disturbance and troublesome in assembly thereof.

SUMMARY OF THE INVENTION

This invention was made to solve the above problems and has an object of providing a single shaft control type magnetic bearing device rotatable at high speed in which damping characteristics are superior and amplitude magnification at resonance point can be reduced, and which is not easily affected by disturbance and easy to be assembled.

To accomplish the foregoing object, a magnetic bearing device according to this invention comprises: a rotary member rotatably supported on a supporting member through a magnetic bearing; a free oscillating member which is oscillatable almost coaxially with said rotary member and disposed at a position not being in contact with both said supporting member and said rotary member; magnetic coupling means for oscillating said free oscillating member and said rotary member together; and a damping member disposed between said free oscillating member and said supporting member.

The foregoing object can be also achieved by a magnetic bearing device comprising: an intermediate member oscillatably supported on a supporting member through a damping member; magnetic coupling means for megnetically coupling said intermediate member and said supporting member; and a rotary member rotatably supported on said intermediate member through a magnetic bearing.

The foregoing object is further achieved by a magnetic bearing device comprising: an intermediate member oscillatably supported on a supporting member through a damping member; nonlinear spring for coupling said intermediate member and said supporting member, returning force/displacement of said nonlinear spring being larger in large displacement than in small displacement; and a rotary member rotatably supported on said intermediate member through a magnetic bearing.

In the magnetic bearing device of above construction, damping characteristics are superior, amplitude magnification at resonace point can be reduced, resonance point can be safely passed through at the time of both starting and stopping. Furthermore, the device is easy to be built up and not easily affected by disturbance, and therefore when incorporating the device into such an apparatus as turbo-molecular pump, working stability of the pump can be improved.

DESCRIPTION OF THE PREFERRED EMBODIMENTS

Several embodiments according to this invention are now described in detail hereinafter with reference to the accompanying drawings.

Figure 5:
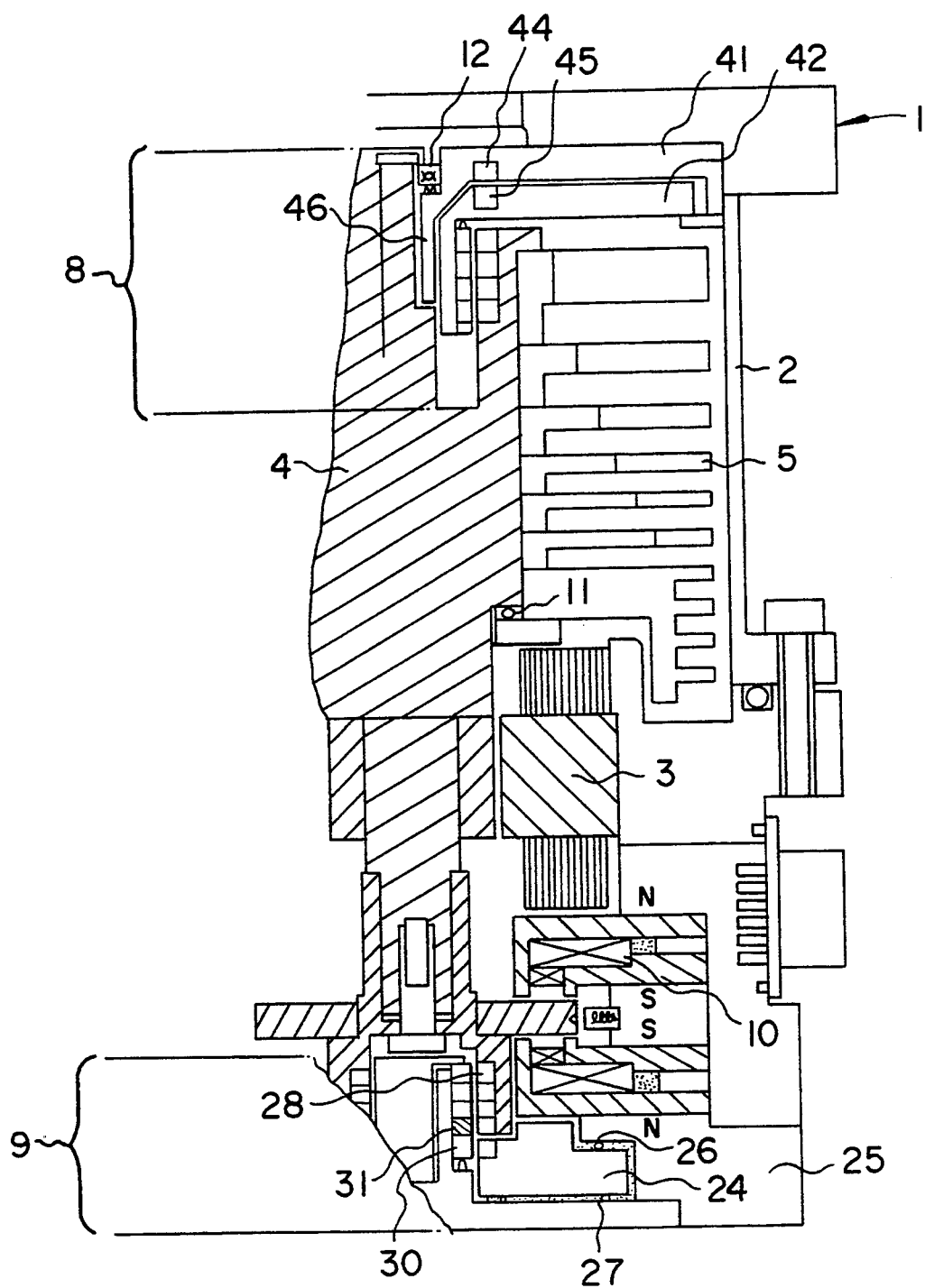
FIG. 5 is a longitudinal sectional view of an example of a turbo-molecular pump using said magnetic bearing device.

FIG. 5 shows an embodiment in which the invention is applied to a turbo-molecular pump, the pump 1 includes a motor 3 disposed in a casing 2 which drives a rotor shaft 4, whereby turbo-blades 5 are rotated to discharge an air from an inlet to an outlet. The mentioned rotor shaft 4 is radially supported by an upper magnetic bearing device 8 and a lower magnetic bearing device 9 respectively at upper and lower sections. The rotor shaft 4 is further supported in the direction of shaft by a magnetic bearing 10. Numerals 11, 12 indicate anti-friction bearings for safety which regulate maximum amount of displacement of the rotor shaft 4.

Figure 1:
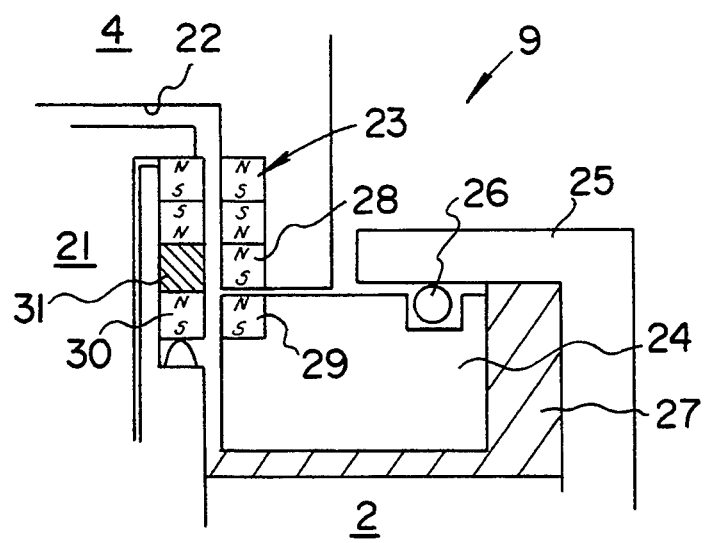
FIG. 1 is a longitudinal sectional view of an embodiment of the magnetic bearing device according to this invention.

A specific construction of the lower bearing device 9 is now described with reference to FIGS. 1 and 2. In FIG. 1, numeral 21 indicates a supporting member fixed to the casing 2. This supporting member 21 is freely inserted in a concave 22 provided at the shaft center portion in lower end of the rotor shaft 4, and is supported radially by a magnetic bearing 23 disposed at a position where outer periphery of the supporting member 21 and inner periphery of the concave 22 face each other. The magnetic bearing 23 comprises permanent magnets arranged in such a manner that identical poles of them face each other.

On the other hand, an annular free oscillating member 24 is disposed oscillatably and coaxially with the rotor shaft 4 around the mentioned supporting member 21 at a position below the rotor shaft 4. The movement of the upper position of the free oscillating member 24 is limited by a position regulating member 25 and a ball 26, while the movement of the lower position thereof is limited by the bottom side of the casing 2 as illustrated in FIG. 1. A damping member 27 of rubber, magnetic fluid, vacuum grease or the like is disposed among the mentioned free oscillating member 24, the position regulating member 25 and the bottom side of the casing 2. Since the upper position of the free oscillating member 24 is limited as mentioned above, the oscillating member 24 is kept so as not to be in contact with end face of the rotor shaft 4. A pair of permanent magnets 28, 29 (serving as magnetic coupling means) are disposed respectively at portions of the mentioned oscillating member 24 and the rotor shaft 4 facing each other so that they are magnetically coupled by magnetic force of the permanet magnets 28, 29, whereby the free oscillating member 24 is oscillated following the oscillation of the rotor shaft 4. The supporting member 21 is also provided with a further permanent magnet 30 which is magnetically repellent in relation to the permanent magnet 29. That is, the permanent magnet 30 serves as a spring for radially supporting the free oscillating member 24, and therefore instead of the mentioned magnetic spring, any other spring member including metal spring, rubber O-ring can be used. It is to be noted that what is oscillated by the oscillation of the rotor shaft 4 is not the permanent magnet on the stationary side but the free oscillating member 24. As a result of this, assembly of magnetic bearing is not negatively affected, and the assembled construction is not easily affected by disturbance. In addition, a spacer 31 is provided in the permanent magnet 30 of the supporting member 21, as illustrated in FIG. 1.

Figure 2:
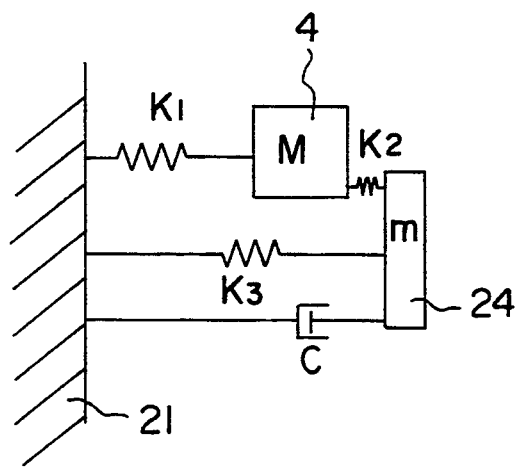
FIG. 2 is an equivalent circuit diagram thereof.

FIG. 2 shows an equivalent circuit of the above described lower bearing device 9, and in which reference numeral K1 indicates spring constant, numeral K2 indicates spring constant between the permanent magnets 28, 29, numeral K3 indicates spring constant between the permanent magnets 29, 30, reference letter C indicates damping function due to the damping member 27, reference letter m indicates the mass of the free oscillating member 24, and reference letter M refers to the mass of the rotor shafts 4. It is obvious that amplitude at resonance point can be reduced as compared with the prior art by appropriately selecting each of these constants.

Figure 3:
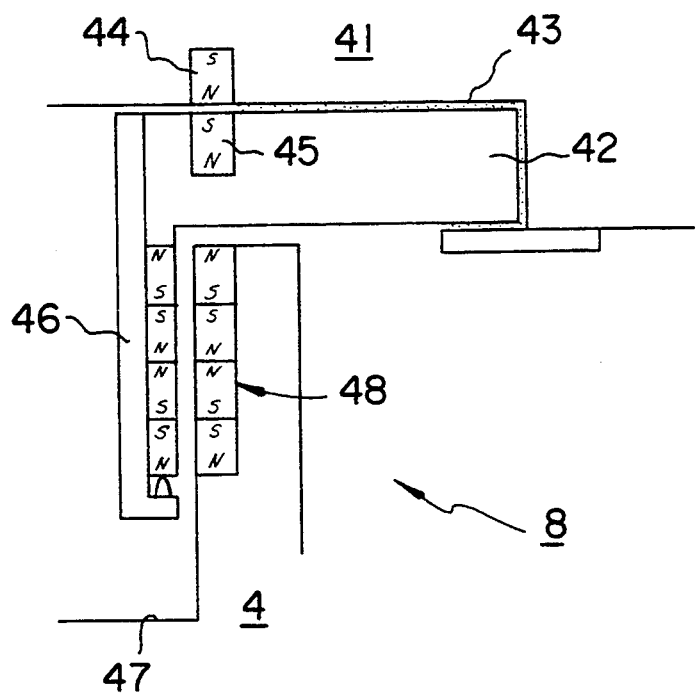
FIG. 3 is a longitudinal sectional view of another embodiment.
Figure 4:
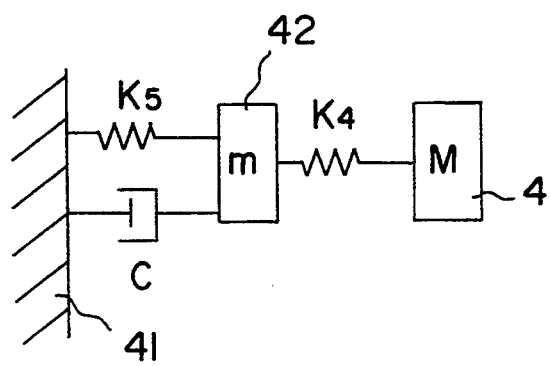
FIG. 4 is an equivalent circuit diagram thereof.

FIGS. 3 and 4 shows a specific construction of the upper bearing device 8 as another embodiment, and in which numeral 41 indicates an upper wall of the casing 2, and numeral 42 indicates an intermediate member, respectively as illustrated in FIG. 3. In this construction, the intermediate member 42 is oscillatably mounted on the upper wall through the damping member 43, and the intermediate member 42 and the upper wall 41 are magnetically coupled by a pair of permanent magnets 44, 45 (magnetic coupling means). A cylindrical section 46 mounted on the intermediate member 42 is freely inserted in a concave 47 provided on the upper end center part of the rotor shaft 4 serving as a rotary member, and a magnetic bearing 48 comprising permanent magnets is disposed between the section 46 and the concave 47. As shown in FIG. 3, the rotor shaft 4 is rotatably supported on the intermediate member 42 through the magnetic bearing 48, wherein the magnetic bearing 48 has a portion imbedded within the rotor shaft 4 and another portion imbedded within the intermediate member 42. The upper bearing device 8 of which equivalent circuit is shown in FIG. 4 also exhibits satisfactory damping performance in the same manner as the foregoing embodiment.

FIG. 4 shows and equivalent circuit of the above-described upper bearing device 8. The equivalent circuit of the upper bearing device 8 shows the masses m, M for the intermediate member 42 and the rotary shaft 4. $K_5$ represents a spring constant, while $K_4$ represents a spring constant between the intermediate member 42 and the rotary shaft 4.

Figure 6:
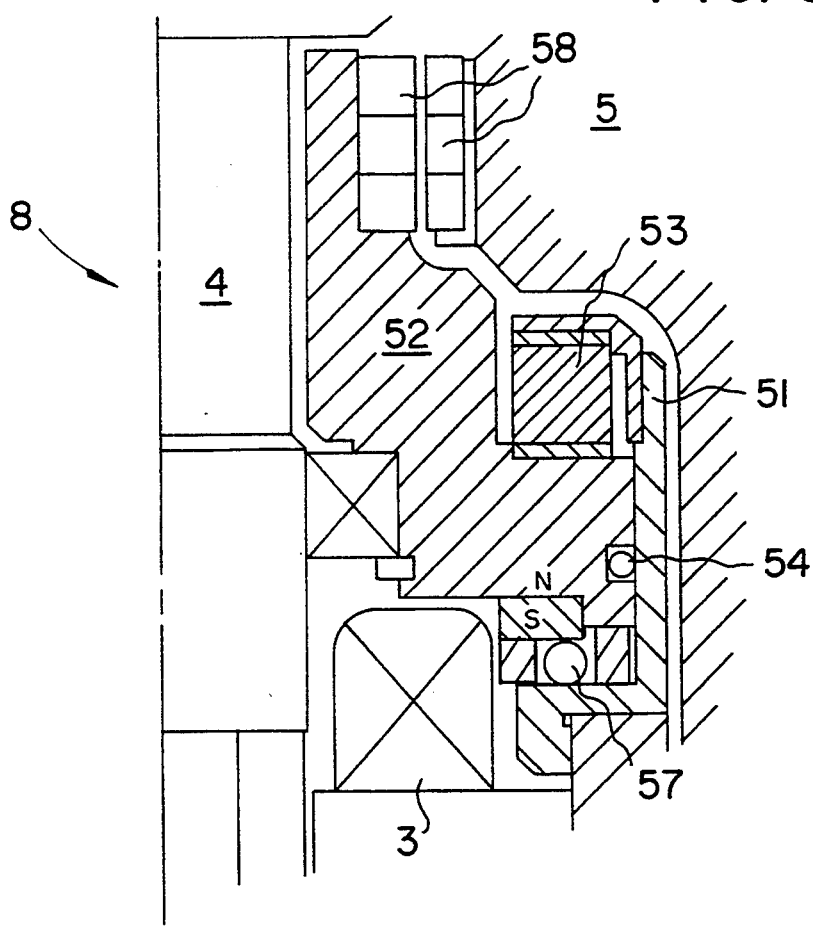
FIG. 6 is a longitudinal sectional view of a further embodiment.
Figure 7:
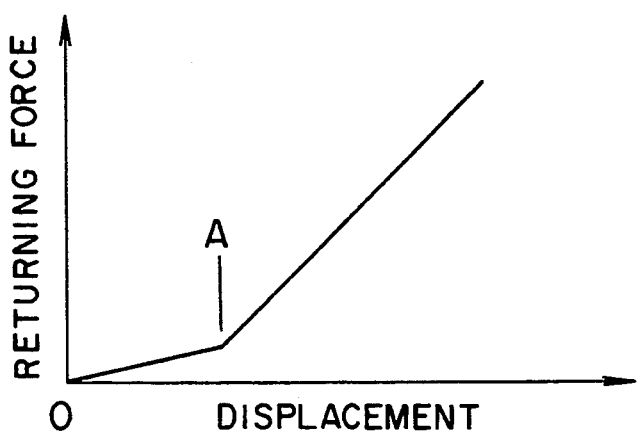
FIG. 7 is an explanatory graph showing an example of displacement-returning force characteristic of an O-ring.

FIG. 6 shows a modification of the upper bearing device 8, and in which numeral 51 indicates a supporting member fixed to the casing side, and numeral 52 indicates an intermediate member, respectively. In this construction, the intermediate member 52 is oscillatably supported on the supporting member 51 through the damping member 53. Annular silicon gel material is preferably used as the damping member 53 of this kind by the following reasons. First, the silicon gel is easy to handle as compared with liquid, and working attitude of the device can be freely selected. Second, gel is a material of relatively small outgassing and suitable for use in vacuum device. Third, energy absorption coefficient and damping capacity are large as compared with rubber and the like. The supporting member 51 and the intermediate member 52 are coupled to each other by an O-ring 54. As shown in FIG. 7, this O-ring 54 has a nonlinear spring characteristic in which returning force/displacement is larger in large displacement range side located on right side from the point A than in small displacement range side located on left side therefrom. In other words, in the displacement range from point O to point A, optimum value for damping the rotary member is quite stably kept, while in the displacement range over the point A, displacement of the rotary shaft due to disturbance can be reduced by giving high rigidity. It also is preferable to use any other member such as hollow O-ring so far as it is a nonlinear type spring having spring like characteristic. As shown in FIG. 6 in this modification, a rotor 5 is rotatably supported with respect to the intermediate member 52 by a magnetic bearing 58 comprising permanent magnets. A portion of the magnetic bearing 58 is imbedded within the rotor 5, and another portion of the magnetic bearing 58 is imbedded within the intermediate member 52, as illustrated in FIG. 6. In addition, numeral 57 indicates a ball for radially supporting the intermediate member 52.

Equivalent circuit of the upper bearing section 8 of this modification is substantially the same as that shown in FIG. 4, and accordingly this modification also exhibits satisfactory damping performance.

In the turbo-molecular pump provided with the upper and lower magnetic bearing devices 8, 9 described above, satisfactory damping effect can be given to vibration of the rotor shaft 4 and amplitude magnification at resonance point can be reduced. As a result, advantages of this invention are such that resonance point can be passed through safely at the time of both starting and stopping the rotor, and that the device is easy to be assembled and not easily affected by disturbance, eventually resulting in improvement of reliability.

While the invention has been particularly shown and described in reference to preferred embodiments thereof, it will be understood by those skilled in the art that changes in form and details may be made therein without departing from the spirit and scope of the invention.

What is claimed is:

1. A magnetic bearing device comprising:
    an intermediate member oscillatably supported on a supporting member through a damping member;

magnetic coupling means for magnetically coupling said intermediate member and said supporting member; and a rotary member rotatably supported on said intermediate member through a magnetic bearing having a portion imbedded within said rotary member and another portion imbedded within said intermediate member.

2. A magnetic bearing device according to claim 1, wherein said damping member is of a silicon gel material.

3. A magnetic bearing device comprising:

an intermediate member oscillatably supported on a supporting member through a damping member;

nonlinear resilient means for resiliently coupling said intermediate member and said supporting member, said resilient means having a return force which is proportional to a displacement thereof; and a rotatably supported on said intermediate member through a magnetic bearing having a portion imbedded within said rotary member and another portion imbedded within said intermediate member.

4. A magnetic bearing device according to claim 3, wherein said damping member is of a silicon gel material.

* * * * *